United States Patent [19]

Henri

[11] 4,293,111
[45] Oct. 6, 1981

[54] BAG FILTER SUPPORT CAGE

[75] Inventor: Paul Henri, Sarnia, Canada

[73] Assignee: Kennecott Corporation, Stamford, Conn.

[21] Appl. No.: 563,537

[22] Filed: Mar. 31, 1975

Related U.S. Application Data

[63] Continuation of Ser. No. 388,180, Aug. 14, 1973, abandoned.

[51] Int. Cl.³ .............................................. B01D 46/02
[52] U.S. Cl. ......................................... 248/95; 55/379
[58] Field of Search ............ 248/95, 94, 97, 99, 248/153, 175; 55/379, 341, 525; 210/485, 497; 141/390, 391; 220/19

[56] References Cited

U.S. PATENT DOCUMENTS

| | | | |
|---|---|---|---|
| 926,038 | 6/1909 | True | 210/485 X |
| 1,693,741 | 12/1928 | Wuest | 210/497 X |
| 2,252,073 | 8/1941 | Gray | 220/19 |
| 2,843,269 | 7/1958 | Dudinec | 210/437 |
| 3,016,984 | 1/1962 | Getzin | 210/497 X |
| 3,096,860 | 7/1963 | Sokol | 220/19 X |
| 3,168,469 | 2/1965 | Abdalian et al. | 210/232 |
| 3,291,310 | 12/1966 | Marvel | 55/379 X |
| 3,401,505 | 9/1968 | Ballard | 55/379 X |
| 3,455,336 | 7/1969 | Ellis | 138/99 X |
| 3,460,680 | 8/1969 | Domnick | 210/497 X |
| 3,501,013 | 3/1970 | Madsen | 210/497 |
| 3,535,852 | 10/1970 | Hirs | 55/302 |
| 3,747,307 | 7/1973 | Peshina et al. | 55/379 |

FOREIGN PATENT DOCUMENTS

| | | | |
|---|---|---|---|
| 669710 | 12/1938 | Fed. Rep. of Germany | 210/497 |
| 158821 | 5/1957 | Sweden | 210/497 |
| 555812 | 9/1943 | United Kingdom | 210/497 |

*Primary Examiner*—Rodney H. Bonck
*Attorney, Agent, or Firm*—William H. Holt

[57] ABSTRACT

The support frame of the invention is comprised of wire mesh bent to cylindrical form with hook-shaped wire stubs projecting from its confronting edges which are hooked and clinched in a fillet with channeled edges providing a side closure; the resultant cage being fitted with base end caps.

2 Claims, 5 Drawing Figures

BAG FILTER SUPPORT CAGE

This is a continuation of copending application Ser. No. 388,180, filed Aug. 14, 1973 now abandoned.

This invention relates to a support frame for a filter bag, and a method of making it. In particular, it relates to an improved support frame of the type comprising an annular, wire mesh, framework disposable within a filter bag to support it in open, functional condition when installed in flow-communicating relation with an air duct.

In the past, a support frame of the character contemplated herein was formed, in part, by bending wire mesh into an annular or cylindrical shape with the margins of the mesh being welded together to a common joint. Apart from other and more obvious objections this type of welded joint had the disadvantage that it left the support frame with an abrasive ridge or zone on its outer surface which, in certain instances, acted to snag the filter bag during its installation thereon and once installed also acted as a constant abrasive to the filter bag wall contiguous therewith causing premature wear of the filter bag and its eventual destruction.

The invention accordingly seeks, amongst other things, to overcome the foregoing and other disadvantages by providing a support frame of the character described in which the margins of the wire mesh are joined together at a smooth joint which is substantially flush with the outer surface of the support frame; this being one of the cardinal objects of the present invention.

Another main object of the present invention is to provide a support frame of the character described in which the welded joints of the prior art are eliminated.

To achieve the foregoing and other obvious objects both stated and unstated hereinafter the invention provides a support frame for a filter bag comprising; wire mesh forming an incomplete enclosure in which opposite margins of said wire mesh are disposed in mutually opposed relation; wires running perimetrically of said enclosure forming part of said mesh and having stubs at each margin projecting towards the opposite margin, and a fillet having channels in which the said wire stubs are respectively clinched to interengage said margins with said fillet and with each other to complete the enclosure.

A related object is to dispose said fillet substantially flush with the outer surface of the enclosure.

The invention as visualized herein has further regard to a method of forming the support frame aforesaid, comprising the steps of: bending wire mesh to define an incomplete enclosure in which opposite margins of said wire mesh are disposed in mutually opposed relation, said wire mesh having perimetrically extending wires formed with stubs, at each margin, projecting towards the opposite margin, and of interengaging said stubs by and with a fillet interconnecting the mutually opposed mesh margins aforesaid and completing the enclosure.

Other objects of the invention more or less broad than the foregoing will become apparent from the hereinafter following description of the elements, parts and principles of the invention given herein solely by way of example with reference to the embodiment herein described and illustrated in the accompanying drawings wherein like reference numerals refer to like parts of the invention and wherein—

Figure 1:
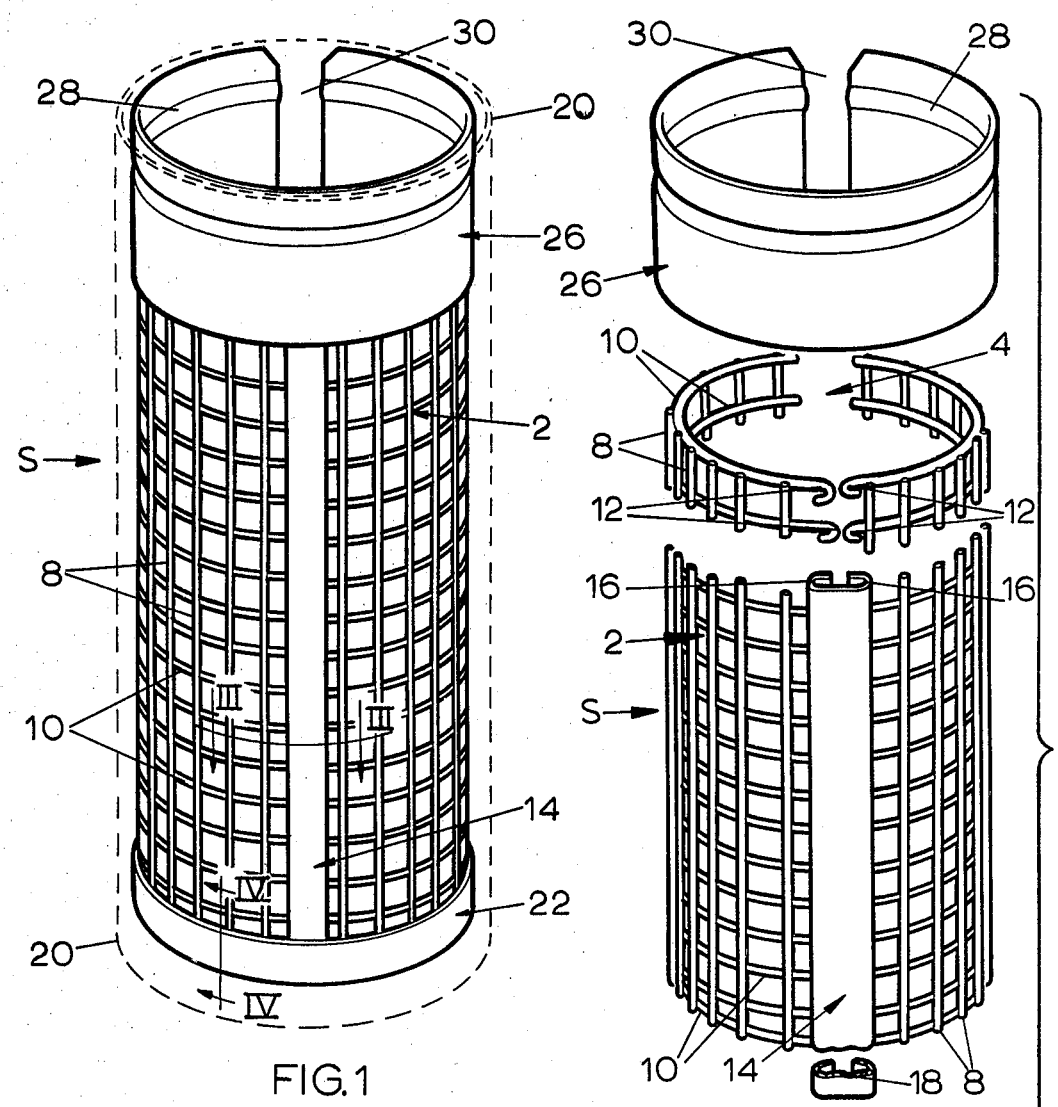
FIG. 1 is a perspective view of the support frame according to the preferred embodiment of the invention.
Figure 2:
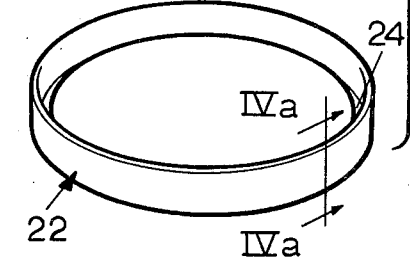
FIG. 2 is a perspective view of various constituent parts of the support frame unassembled.

In its broadest aspects, the invention visualizes forming a support frame S as illustrated in FIG. 1 by initially bending wire mesh 2 to define an incomplete enclosure 4 in which opposite margins 6—6 of said wire mesh 2 are disposed in mutually opposed relation as best shown in FIG. 2; said wire mesh 2 having axially extending wires 8 as well as perimetrically extending wires 10 formed with stubs 12 at each said margin 6 projecting towards the opposite margin 6; said stubs 12 being subsequently interengaged by and with a fillet 14 to interconnect said mutually opposed mesh margins 6—6 and resultantly complete the enclosure 4.

More particularly, the interengagement of said wire stubs 12 by and with said fillet 14 is effected by a clinching action; this being achieved in this embodiment by providing said fillet 14 with opposed channels 16—16 (FIG. 3) to interengage said margins 6—6 with it and with each other to complete the enclosure 4 as aforesaid. Specifically, it will be recognized from FIG. 3 that said stubs 12 are hook-shaped and interhooked with said channels 16 to effect the clinching aforesaid.

Of course, it will be understood that the interhooking between said hooked stubs 12 and said channels 16 may be effected by relative sliding or telescoping movement of said opposed mesh margins 6—6 and said fillet 14 in an end-wise direction indicated in FIG. 2 until respective opposed ends of said fillet 14 and said margins 6—6 are disposed in aligned relation with each other to complete the enclosure 4 as depicted in FIG. 1.

Figure 3:
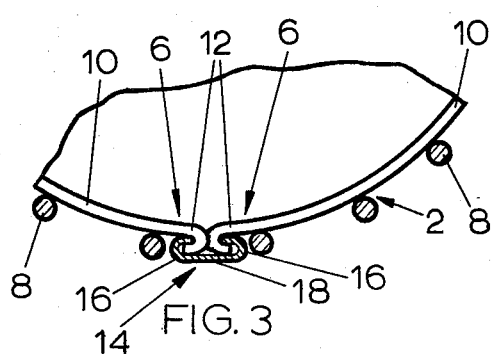
FIG. 3 is a view of the support frame joint taken along lines III—III in FIG. 1 and illustrating the stubs interhooked with the fillet.

Although not an essential limitation to the broad inventive concept, the invention nevertheless further visualizes compressing said channels 16—16 about said stubs 12 to interhook them with each other rigidly and permanently; said stubs 12 on said opposite margins 6—6 being in slightly overlapped relation with respect to each other as shown in FIG. 3.

It will be appreciated that the described interengagement between the stubs 12 and fillet 14 serves not only to provide a strong and permanent joint but serves also to provide one which does not require welding as heretofore required in the prior art.

Moreover, it will be further appreciated upon viewing FIG. 3 that said fillet 14, and particularly its web 18 can be hammered substantially flush with the outer surface or contour of said enclosure 4 providing, amongst other things, a smooth, nonabrasive and non-snagging joint to thus preserve the integrity of the filter bag 20 (shown in dotted lines in FIG. 1) not only when it is being installed thereon but, thereafter, in use.

Figures 4, 4A:
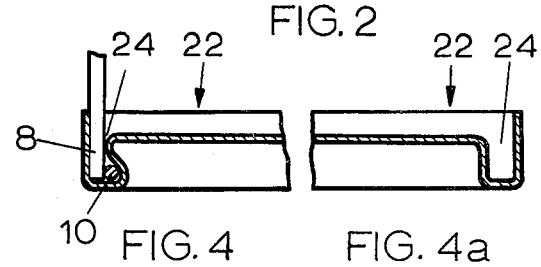
FIG. 4 is a cross-sectional view of the cap taken along lines IV—IV in FIG. 1 and showing the wire mesh being accommodated and secured within the cap.
FIG. 4a is a cross-sectional view of the cap taken along lines IVa—IVa in FIG. 2 and showing the cap prior to being assembled with the wire mesh.

The invention further visualizes a cap 22 at one end of said enclosure 4 which may, as in this embodiment, include an annular trench 24 at its periphery as best shown in FIG. 4a within which said wire mesh 2 is accommodated and secured as shown in FIG. 4. More particularly, the invention visualizes pinching together the walls of said trench 24 after the wire mesh has been inserted therein; the end result being to trap therein one of said perimetrically extending wires 10 as best illustrated in FIG. 4.

At the opposite end of said enclosure 4, a rim 26 (FIGS. 1 and 2) is suitably attached thereto and preferably includes means 28 for attaching said support frame S to an air duct (not shown); said attaching means 28 being constituted in this embodiment by an annular bead on the interior of said rim 26 which is mateable with an annular groove usually provided on the exterior of an air duct (not shown).

In addition thereto, it will be further recognized from FIG. 1 that said rim 26, at least, includes a narrow slot 30 extending axially of said enclosure 4; said slot 30 permitting radial flexure of said rim 26 under moderately strong forces to facilitate the mating attachment of its bead 28 with the co-operating groove on the air duct as aforesaid.

The filter bag 20 in turn may be mounted on said support frame S by whatever means deemed expedient which do not form part of this invention, it being conceivable, within the context of this submission, that any of a variety of mounting means may be employed for this purpose.

By way of brief summary, therefore, the invention visualizes providing a support frame S for a filter bag 20; said support frame S being formed of wire mesh bent into an enclosure 4 with its opposed margins 6—6 joined together to form a smooth joint of the same general character as the rest of the outer support frame surface. In the result and under rigorous and extensive testing, said support frame S has proven itself to be, unlike the prior art, instrumental in significantly prolonging the useful life of filter bags not to mention the attendant savings in bag replacement costs.

What I claim is:

1. A support cage for insertion into a filter bag for supporting said bag in an open condition, said support cage being comprised of an elongated double ended tube formed of a bent sheet of open wire mesh and having opposite marginal portions disposed adjacent to each other and extending longitudinally of said tube, a fillet having channel means formed therein, said opposite marginal portions of said tube being disposed within said channel means, said fillet being clinched upon said opposite marginal portions and forming a smooth seam for minimizing snagging of said filter bag during contact of said support cage with said filter bag, said wire mesh including a plurality of wires extending longitudinally of said support cage and a plurality of wires extending peripherally of said support cage, wherein said wires extending peripherally of said support cage include hook-shaped end portions with said end portions being clinched by said fillet, and wherein said wires extending longitudinally of said support cage are disposed outwardly of and overlie the wires extending peripherally of said support cage such that said fillet, when engaged with said hook-shaped end portions, lies substantially flush with said wires extending longitudinally to form said smooth seam.

2. A support cage as defined in claim 1 including a rim attached to one end of said double ended tube, and an end cap attached to the other end of said tube.

* * * * *